(12) United States Patent
Browne et al.

(10) Patent No.: US 7,761,360 B1
(45) Date of Patent: *Jul. 20, 2010

(54) METHOD AND SYSTEM FOR SIMULATING IMPLIED VOLATILITY SURFACES FOR USE IN OPTION PRICING SIMULATIONS

(75) Inventors: Sid Browne, Brooklyn, NY (US); Arthur Maghakian, New York, NY (US)

(73) Assignee: Goldman Sachs & Co., New York, NY (US)

(*) Notice: Subject to any disclaimer, the term of this patent is extended or adjusted under 35 U.S.C. 154(b) by 39 days.

This patent is subject to a terminal disclaimer.

(21) Appl. No.: 11/557,937

(22) Filed: Nov. 8, 2006

Related U.S. Application Data

(62) Division of application No. 09/896,488, filed on Jun. 29, 2001, now Pat. No. 7,149,715.

(51) Int. Cl.
*G06Q 40/00* (2006.01)

(52) U.S. Cl. .................. 705/36 R; 705/7; 705/35; 705/37; 705/38

(58) Field of Classification Search .............. 705/36 R, 705/37, 36 T, 35–38, 7
See application file for complete search history.

(56) References Cited

U.S. PATENT DOCUMENTS

| | | | |
|---|---|---|---|
| 5,819,237 | A | 10/1998 | Garman |
| 5,930,762 | A | 7/1999 | Masch |
| 6,058,377 | A | 5/2000 | Traub et al. |
| 6,085,175 | A | 7/2000 | Gugel et al. |
| 6,122,623 | A | 9/2000 | Garman |
| 6,546,375 | B1 * | 4/2003 | Pang et al. .................. 705/37 |
| 7,149,715 | B2 * | 12/2006 | Browne et al. ............ 705/36 R |
| 7,440,916 | B2 * | 10/2008 | Browne et al. ............ 705/36 R |

(Continued)

FOREIGN PATENT DOCUMENTS

JP  2002288436  10/2002

(Continued)

OTHER PUBLICATIONS

Emanuel Derman, Iraj Kani and Joseph Z. Zou, "The Local Volatility Surface," Quantitative Strategies Research Notes, Dec. 1995, pp. 1-28.

(Continued)

*Primary Examiner*—Narayanswamy Subramanian
(74) *Attorney, Agent, or Firm*—Chadbourne & Parke LLP; Walter G. Hanchuk

(57) ABSTRACT

A method and system for simulating changes in volatility for a price of a particular option on an underlying financial instrument is disclosed. A volatility surface model having at least one surface parameter is provided along with a set of volatilities for a plurality of options on the underlying financial instrument. The set of volatilities is analyzed to determine an initial value for each surface parameter which, when used in the surface model, defines a surface approximating the set of volatilities. The values of the surface parameters are then evolved using an appropriate evolution function. A volatility value for a particular option is extracted from the volatility surface defined by the evolved surface parameter values. The extracted volatility value can then be used in an option pricing model to provide a price of the particular option.

18 Claims, 5 Drawing Sheets

U.S. PATENT DOCUMENTS

| | | | |
|---|---|---|---|
| 2003/0009399 A1* | 1/2003 | Boerner | 705/35 |
| 2003/0014355 A1* | 1/2003 | Browne et al. | 705/38 |
| 2003/0018456 A1* | 1/2003 | Browne et al. | 703/2 |
| 2003/0074167 A1* | 4/2003 | Browne et al. | 703/2 |
| 2004/0039673 A1* | 2/2004 | Amberson et al. | 705/36 |
| 2005/0044027 A1* | 2/2005 | Rodgers et al. | 705/35 |
| 2008/0120250 A1* | 5/2008 | Hiatt, Jr. | 705/36 R |
| 2009/0012912 A1* | 1/2009 | Browne et al. | 705/36 R |
| 2009/0216673 A1* | 8/2009 | Watts et al. | 705/35 |

FOREIGN PATENT DOCUMENTS

| | | |
|---|---|---|
| JP | 2004038951 | 2/2004 |
| JP | 2004038952 | 2/2004 |

OTHER PUBLICATIONS

John Hull and Alan White, "Incorporating Volatility Updating Into the Historical Simulation Method For Value-at-Risk," The Journal of Risk, 1998, vol. 1, No. 1, pp. 4-19.

* cited by examiner

METHOD AND SYSTEM FOR SIMULATING IMPLIED VOLATILITY SURFACES FOR USE IN OPTION PRICING SIMULATIONS

This is a divisional application of prior application Ser. No. 09/896,488, filed Jun. 29, 2001, now U.S. Pat. No. 7,149,715 to which priority under 35 U.S.C. §120 is claimed and herein incorporated by references.

FIELD OF THE INVENTION

This invention is related to a method and system for measuring market and credit risk and, more particularly, to an improved method for the simulating the evolution of a volatility surface for use in simulating the price of a financial instrument.

BACKGROUND

A significant consideration which must be faced by financial institutions (and individual investors) is the potential risk of future losses which is inherent in a given financial position, such as a portfolio. There are various ways for measuring potential future risk which are used under different circumstances. One commonly accepted measure of risk is the value at risk ("VAR") of a particular financial portfolio. The VAR of a portfolio indicates the portfolio's market risk at a given percentile. In other words, the VAR is the greatest possible loss that the institution may expect in the portfolio in question with a certain given degree of probability during a certain future period of time. For example, a VAR equal to the loss at the $99^{th}$ percentile of risk indicates that there is only a 1% chance that the loss will be greater than the VAR during the time frame of interest.

Generally, financial institutions maintain a certain percentage of the VAR in reserve as a contingency to cover possible losses in the portfolio in a predetermined upcoming time period. It is important that the VAR estimate be accurate. If an estimate of the VAR is too low, there is a possibility that insufficient funds will be available to cover losses in a worst-case scenario. Overestimating the VAR is also undesirable because funds set aside to cover the VAR are not available for other uses.

To determine the VAR for a portfolio, one or more models which incorporate various risk factors are used to simulate the price of each instrument in the portfolio a large number of times using an appropriate model. The model characterizes the price of the instrument on the basis of one or more risk factors, which can be broadly considered to be a market factor which is derived from tradable instruments and which can be used to predict or simulate the changes in price of a given instrument. The risk factors used in a given model are dependent on the type of financial instrument at issue and the complexity of the model. Typical risk factors include implied volatilities, prices of underlying stocks, discount rates, loan rates, and foreign exchange rates. Simulation involves varying the value of the risk factors in a model and then using the model to calculate instrument prices in accordance with the selected risk factor values. The resulting price distributions are aggregated to produce a value distribution for the portfolio. The VAR for the portfolio is determined by analyzing this distribution.

A particular class of instrument which is simulated is an option. Unlike simple securities, the price of an option, and other derivative instruments, is dependant upon the price of the underlying asset price, the volatility of changes in the underlying asset price, and possibly changes in various other option parameters, such as the time for expiration. An option can be characterized according to its strike price and the date it expires and the volatility of the option price is related to both of these factors. Sensitivity of the option volatility to these effects are commonly referred to skew and term. Measures of the volatility for a set of options can be combined to produce a volatility surface. For example, FIG. 1 is a graph of the implied volatility surface for S&P 500 index options as a function of strike level and term to expiration on Sep. 27, 1995.

The volatility surface can be used to extract volatility values for a given option during simulation. The extracted volatility value is applied to an option pricing model which provides simulated option prices. These prices can be analyzed to make predictions about risk, such as the VAR of a portfolio containing options. The volatility surface is not static, but changes on a day-to-day basis. Thus, in order to make risk management decisions and for other purposes, changes in the volatility surface need to be simulated as well.

Various techniques can be used to simulate the volatility surface over time. In general financial simulations, two simulation techniques are conventionally used: parametric simulation and historical simulation and variations of these techniques can be applied to simulate volatilities.

In a parametric simulation, the change in value of a given factor is modeled according to a stochastic or random function responsive to a noise component $\epsilon$ is a noise component. During simulation, a suitable volatility surface can be used to extract a starting volatility value for the options to be simulated and this value then varied in accordance with randomly selected values of noise over the course of a simulation.

Although parametric simulation is flexible and permits the model parameters to be adjusted to be risk neutral, conventional techniques utilize a normal distribution for the random noise variations and must explicitly model probability distribution "fat-tails" which occur in real life in order to compensate for the lack of this feature in the normal distribution. In addition, cross-correlations between various factors must be expressly represented in a variance-covariance matrix. The correlations between factors can vary depending on the circumstances and detecting these variations and compensating is difficult and can greatly complicate the modeling process. Moreover, the computational cost of determining the cross-correlations grows quadratically with the number of factors making it difficult to process models with large numbers of factors.

An alternative to parametric simulation is historical simulation. In a historical simulation, a historical record of data is analyzed to determine the actual factor values and these values are then selected at random during simulation. This approach is extremely simple and can accurately capture cross-correlations, volatilities, and fat-tail event distributions. However, this method is limited because the statistical distribution of values is restricted to the specific historical sequence which occurred. In addition, historical data may be missing or non-existent, particularly for newly developed instruments or risk factors, and the historical simulation is generally not risk neutral.

Accordingly, there is a need to provide an improved method for simulating a volatility surface to determine volatility values during option pricing simulation.

It would be advantageous if such a method captured cross-correlations and fat-tails without requiring them to be specifically modeled and while retaining the advantageous of parametric modeling techniques.

It would also be advantageous if such a method could be extended to other multi-variant factors which are used in option pricing models.

SUMMARY OF THE INVENTION

These and other needs are met by the present invention wherein option volatility is simulated by defining a parameterized volatility surface and then evolving the surface parameters in accordance with historical data during the simulation. In particular, a volatility surface model is defined by a series of surface parameters $\beta$. The initial values of the surface parameters are determined by regressing the set of initial option volatility data relative to expiration time vs. delta or other appropriate axes. The model is calibrated to determine the offset of the starting option volatilities from the value provided by the initial surface model.

At each "tick" of the simulation, the beta parameter values defining the volatility surface are adjusted according to a function which provides a next beta value based upon the present beta value and a noise-varying measure of the beta volatility. The beta volatility can be determined by analyzing a time-series of beta values from volatility surfaces derived from historical data or estimated through other means. The new beta parameter values are then applied to the surface model to define a simulated volatility surface which is used to extract a volatility value for an option during simulation. The extracted value is adjusted in accordance with the calibration data and the calibrated simulated volatility value is applied to the pricing model.

Various techniques can be used to simulate the noise-varying volatility of the beta parameters. Preferably, and according to a further aspect of the invention, the noise variations in the beta volatility are selected from a set of risk-neutral bootstrapped residual values generated through analysis of a time-varying sequence of beta values from volatility surfaces fit to historical data.

BRIEF DESCRIPTION OF THE FIGURES

The foregoing and other features of the present invention will be more readily apparent from the following detailed description and drawings of illustrative embodiments of the invention in which.

DETAILED DESCRIPTION OF THE PREFERRED EMBODIMENTS

The present invention is directed to an improved technique for simulating the time-evolution of a risk factor value which is dependant upon two or more variables. This invention will be illustrated with reference to simulating the performance of derivative instruments with a risk factor dependant upon multiple factors, and, in particular, the volatility surface for options. Option prices have a volatility that is dependant upon both the price of the underling security and the time remaining before the option expires. The volatility for the various options which derive from a given security can be represented as a volatility surface and the present methods provide an improved technique for simulating the evolution of the volatility surface for use in, e.g., risk analysis simulations. The methodology can be applied to other types of derivative instruments and more generally to simulation models which have risk factors dependant upon multiple factors which can be modeled as "multi-dimensional surfaces", such as volumes, or higher dimensional constructs.

An option can be characterized according to its strike price and the date it expires and the volatility of the option price is related to both of these factors. The ratio between the change in option price P and the security price S is conventionally expressed as "delta":

$$\Delta = \frac{\partial P}{\partial S} \qquad \text{(Equ. 1)}$$

One method of specifying a volatility surface is with reference to delta vs. the term T remaining for an option, e.g., $\sigma(T,\Delta)$. The use of delta provides a dimensionless value which simplifies comparisons between different options. However, other variables for the surface $\sigma(x,y)$ can be alternatively used.

Figure 1:
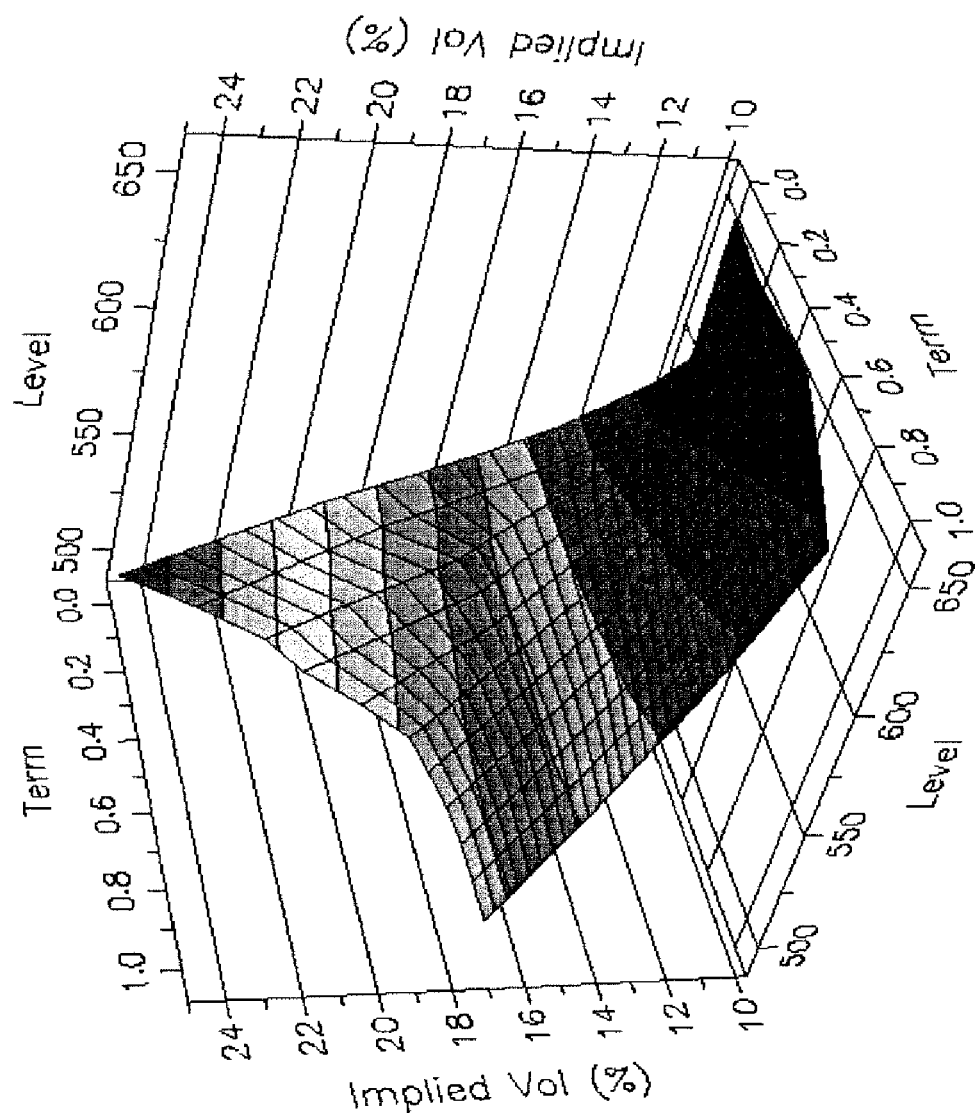
FIG. 1 is a graph of a sample volatility surface.
Figure 2:
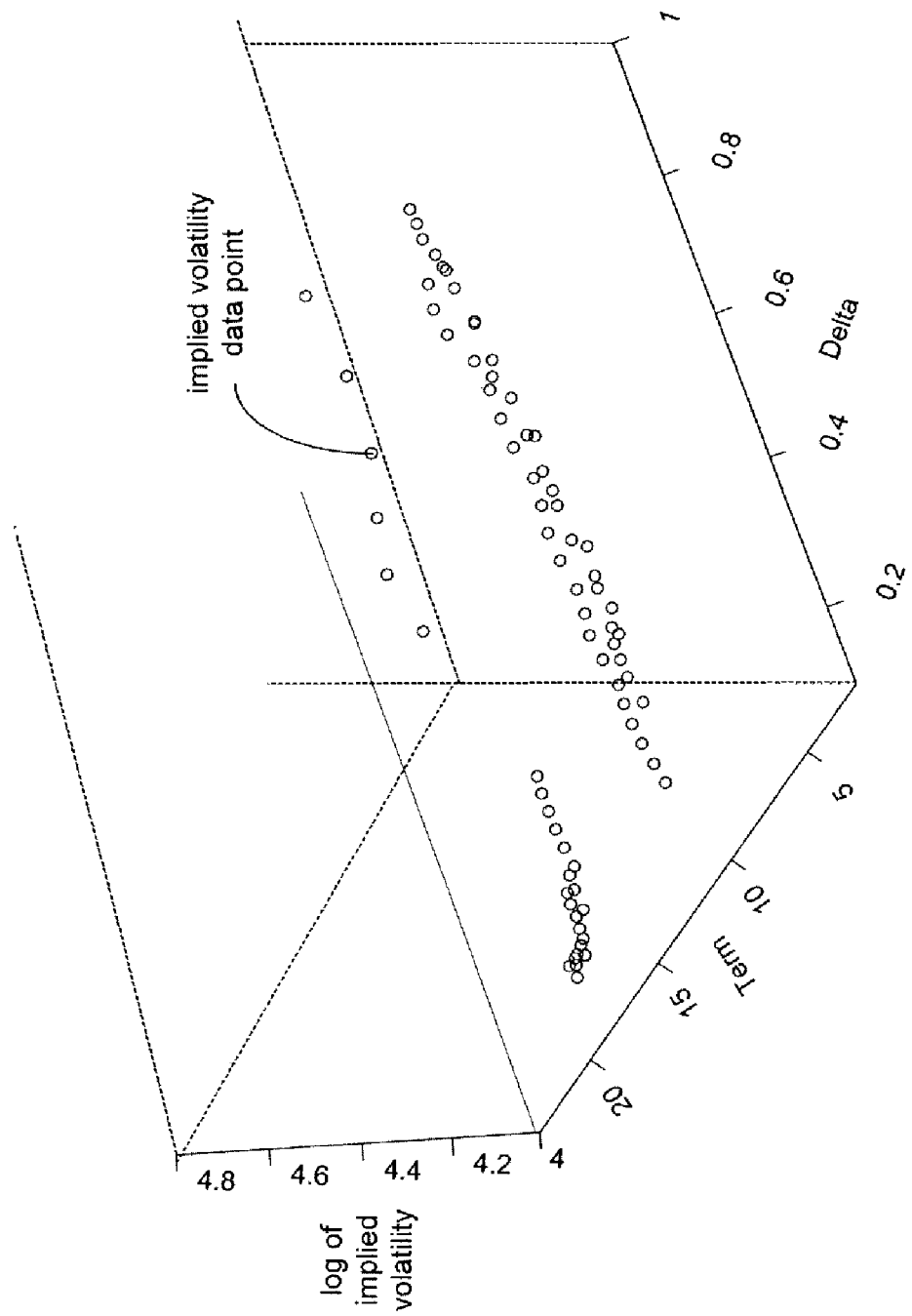
FIG. 2 is a graph of a set of volatility points for various options plotted against the corresponding T and $\Delta$ axis.

Initially, historical data for options of a given security is analyzed to determine (or otherwise select) an implied volatility $\sigma_{imp}$ for each option of interest at a starting point of the simulation, e.g., beginning from the most recent closing prices. The volatility points $\sigma_{imp}(T,\Delta)$ for the various options define a set of values which can be plotted against the corresponding T and delta axes. A sample plot is illustrated in FIG. 2.

According to one aspect of the invention, a parameterized volatility surface providing a measure of the implied volatility $\sigma_i$ for a given delta and T at a time index i, is defined as a function F of one or more surface parameters $\beta_{0,i} \ldots \beta_{n,i}$, delta, and T:

$$\sigma_i(\Delta,T) = F(\beta_{0,i}, \ldots, \beta_{n,i}, \Delta, T) + e_i(\Delta,T) \qquad \text{(Equ. 2)}$$

As will be appreciated, various scaling functions can be applied to the value of $\sigma_i$. The error or noise term $e_i$ is not technically a component of the volatility surface model itself but is shown herein to indicate that the modeled surface may only be an approximation of the volatility values.

Figure 3:
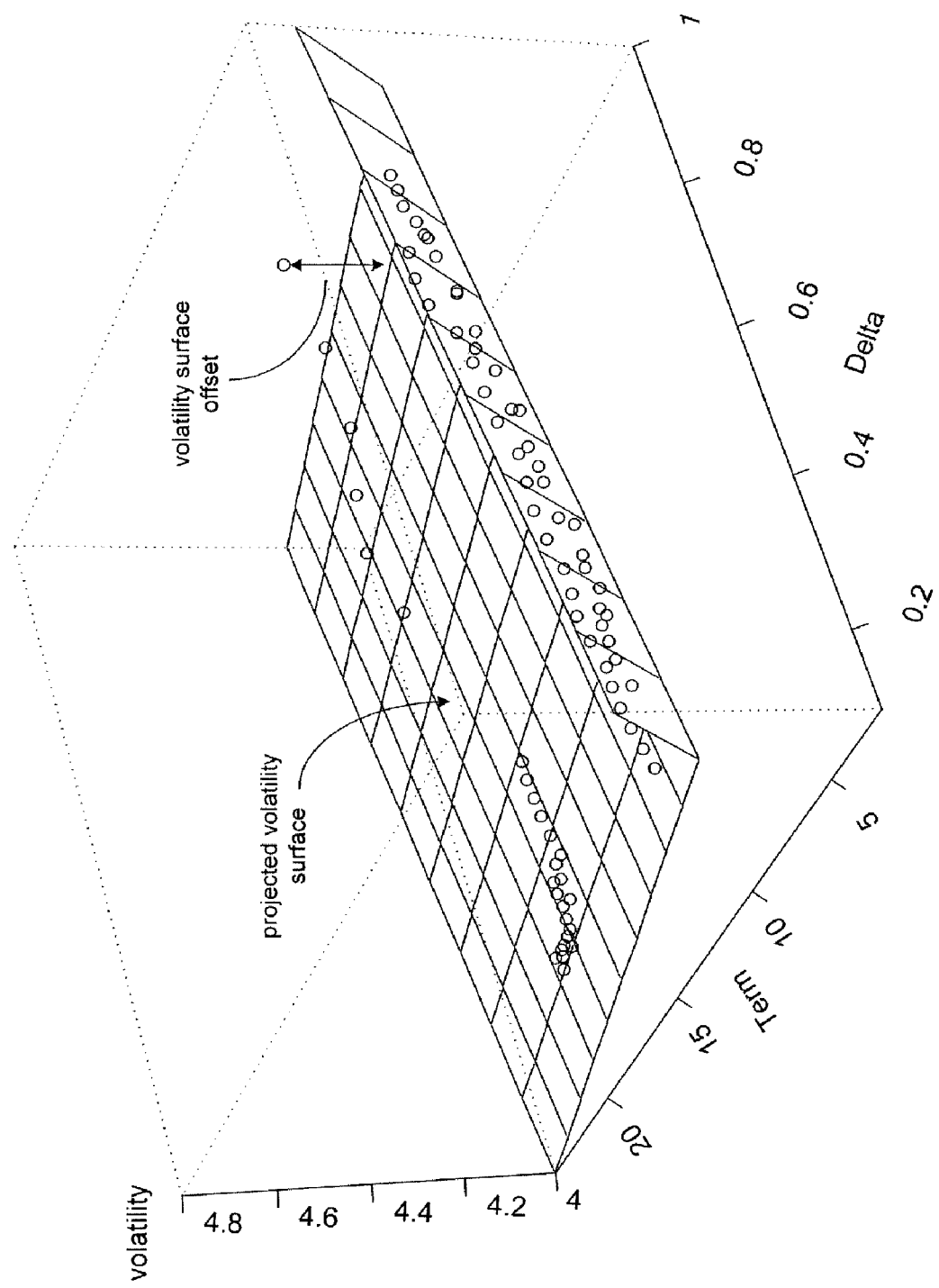
FIG. 3 shows an implied volatility surface determined in accordance with the invention for the set of volatility data points of FIG. 2.

Prior to simulation, values for the parameters $\beta_0 \ldots \beta_n$ are determined to define a volatility surface via the volatility surface model which approximates the historical volatility data from a given time index. Suitable values can be determined using an appropriate regression analysis. The residual factor $e_i(\Delta,T)$ can be defined for at least some of the option points as used to determine the surface parameter values as an offset of the source volatility point from the corresponding point on the modeled volatility surface. FIG. 3 shows an implied volatility surface determined in accordance with Equation 5 (discussed below) from a regression of the set of volatility data points of FIG. 2. The residual offset values can be subsequently used to calibrate or adjust volatility values which are extracted from the modeled volatility surface.

The form of the surface parameterization function and the number of different $\beta$ parameters can vary depending on implementation specifics. Greater numbers of surface parameters can provide a surface that more closely fits the sample points but will also increase the complexity of the model. Preferably, the implied volatility surface is defined with reference to the log of the implied volatility values and is a linear or piecewise linear function having at least one constant or planer term, one or more linear or piecewise linear parameter functions of delta, and one or more linear or piecewise linear parameter functions of T A most preferred form of the surface parameterization function, in which the volatility value is scaled according to a log function, is:

$$\ln \sigma_i(\Delta,T) = \beta_{0,i} + \beta_{1,i}(\Delta-x_1) + \beta_{2,i}(T-x_2)^+ + \beta_{3,i}(T-x_3)^+ + e_i(\Delta,T) \quad \text{(Equ. 3)}$$

where $(x)^+$ is a piecewise linear function equal to x where x>0 and otherwise equal to zero, $e_i(\Delta,T)$ is a residual noise factor, and $x_1, x_2,$ and $x_3$ are constant terms having values selected as appropriate to provide an acceptable surface fit to the historical data in accordance with user preferences and other criteria.

Suitable values for $x_1, x_2,$ and $x_3$ can be determined experimentally by applying the simulation technique disclosed herein using different values of $x_1 \ldots x_3$ and then selecting values which provide the most accurate result. A similar technique can be used to select appropriate surface parameterizing functions for the simulation of other risk factors characterized by multiple variables. In a specific implementation, the following values have been found to provide very suitable results:

$$\ln \sigma_i(\Delta,T) = \beta_{0,i} + \beta_{1,i}(\Delta-0.5) + \beta_{2,i}(T-4)^+ + \beta_{3,i}(T-24)^+ + e_i(\Delta,T) \quad \text{(Equ. 4)}$$

with the values of T specified in months. Variations in the specific values used and the form of the equation can be made in accordance with the type of security and risk factor at issue as well as various other considerations which will be recognized by those of skill in the art.

Depending upon the type of derivative value at issue and the data available, conversions or translations of derivative characteristics might be required prior to using that data in the surface-defining regression. In addition, some decisions may need to be made regarding which data values to use during the regression. Preferably, a set of predefined guidelines is used to determine how the values of the implied volatilities which are regressed to derive the surface parameters are selected and also to identify outlying or incomplete data points which should be excluded from the regression.

According to a particular set of guidelines, for each underlier, the implied volatilities used in the analysis can be selected using following rules:
  For each exchange traded European option on the underlier, closing bid and ask implied volatilities along with corresponding delta and term are identified
  Deltas of implied volatilities for puts are converted to the deltas of calls using put-call parity
  Implied volatilities with missing bid or ask or volatilities with delta <0.15 or delta >0.85 are excluded
  Average of bid-ask spread is used as data point
  For underliers without exchange tradable options, implied volatilities of OTC options marked by traders are used As those of skill in the art will recognize, other sets of guidelines can alternatively be used depending upon the circumstances, the instruments at issue, and the variables against which the volatility values are plotted to define the surface.

After the initial surface parameters β for the surface volatility model are determined, the model can be used to simulate changes in option price volatility by evolving the values of the beta surface parameters during simulation and applying the simulated β values to the surface parameterization function to define a corresponding simulated volatility surface. The implied volatility of an option during simulation can be determined by referencing the simulated volatility surface in accordance with the values of T and delta for that option at that point in the simulation.

Although a typical regression analysis can produce a surface which matches the source data points fairly well, as seen in FIG. 3, many of the actual implied volatilities which are used to determine the surface parameters do not fall on the parameterized surface, but instead are offset from it by a certain residual amount. Accordingly, after the volatility surface is beta-parameterized and simulated, it is recalibrated back to the actual implied volatilities by determining the residual offset $e_i(\Delta,T)$ from the parameterized surface for at least some of the source volatility points.

To extract the implied volatility for an individual option during simulation, the simulated price of the underlying security and the time before the option expires are used to determine a point on the simulated volatility surface (generated using the simulated surface parameter values). The residual offset for that point is then calculated with reference to the calibration data, for example, by interpolating from the nearest neighbor calibration points. The value of the volatility surface point adjusted by the interpolated residual offset can then be applied to the simulation option pricing model. Although the changes in the calibration residuals could be analyzed and adjusted during the simulation process, preferably the calibration residuals are assumed to be constant in time for all generated scenarios.

Various techniques can be used to calculate the evolving values of the β parameters during simulation. Generally, the beta evolution function is a function g of one or more parameters $a_1 \ldots a_j$, a prior value of beta, and a corresponding noise component ε:

$$\beta_{m,i} = g(a_1, \ldots a_j, \beta_{m,i-1}, \epsilon_{m,i}) \quad \text{(Equ. 5)}$$

Preferably, the beta evolution function g is a linear mean-reversion process that provides a simulated time series of each individual beta parameter. A preferred form of the reversion providing a change in the beta value is:

$$\Delta\beta_{m,i} = \alpha_m(\theta_m - \beta_{m,i-1}) + \upsilon_m \epsilon_{m,i} \quad \text{(Equ. 5)}$$

where α is a mean-reversion speed, θ is a mean for the $\beta_m$, υ is a value for the volatility of $\beta_m$, and ε is a random, pseudo-random, or other noise term.

The values of α, θ, and υ can be determined empirically, estimated, or through other means. A preferred method is to determine these values based upon historical analysis. In particular, historical data for various prior days i (or other time increment) is analyzed to generate a corresponding historical volatility surface having respective surface parameter values $\beta_{m,i}$. This analysis produces a time series of values for each surface parameter $\beta_m$. The time-varying sequence of $\beta_m$ is then analyzed to determine the corresponding historic mean $\theta_m$, mean-reversion speed $\alpha_m$, and mean reversion volatility $\upsilon_m$. These values can then be used in Equ. 6 to simulate future values of the respective $\beta_m$.

In some instances, there may be an insufficient number of implied volatility points to fully regress the set and determine appropriate values for each surface parameter. Various conditions specifying a minimum number of points and compensation techniques for situations with fewer points can be used. These conditions are dependant upon the characteristics of the surface parameterizing function and the number of beta parameters at issues.

According to a particular set of conditions which can be used in conjunction with a surface parameterization of the form shown in Equ. 3, above, at least 8 implied volatility points should be present to run a regression to determine the four beta parameters. These 8 volatilities should have at least 2 different deltas and one term longer than 10 months. In cases when these requirements are not met, the surface parameterization function can be simplified for the regression to reduce the number of betas. For example, when there is only one implied volatility point, only $\beta_0$, will be calculated and the values for the remaining betas can be set to the previous day's values. Other conditions can be specified for use when determining the parameters of the beta evolution function. For example, in a historical analysis using the mean reversion formula of Equ. 6, the mean reversion speed $\alpha_m$ can be set to 2 years if the calculated speed is negative.

Figure 4:
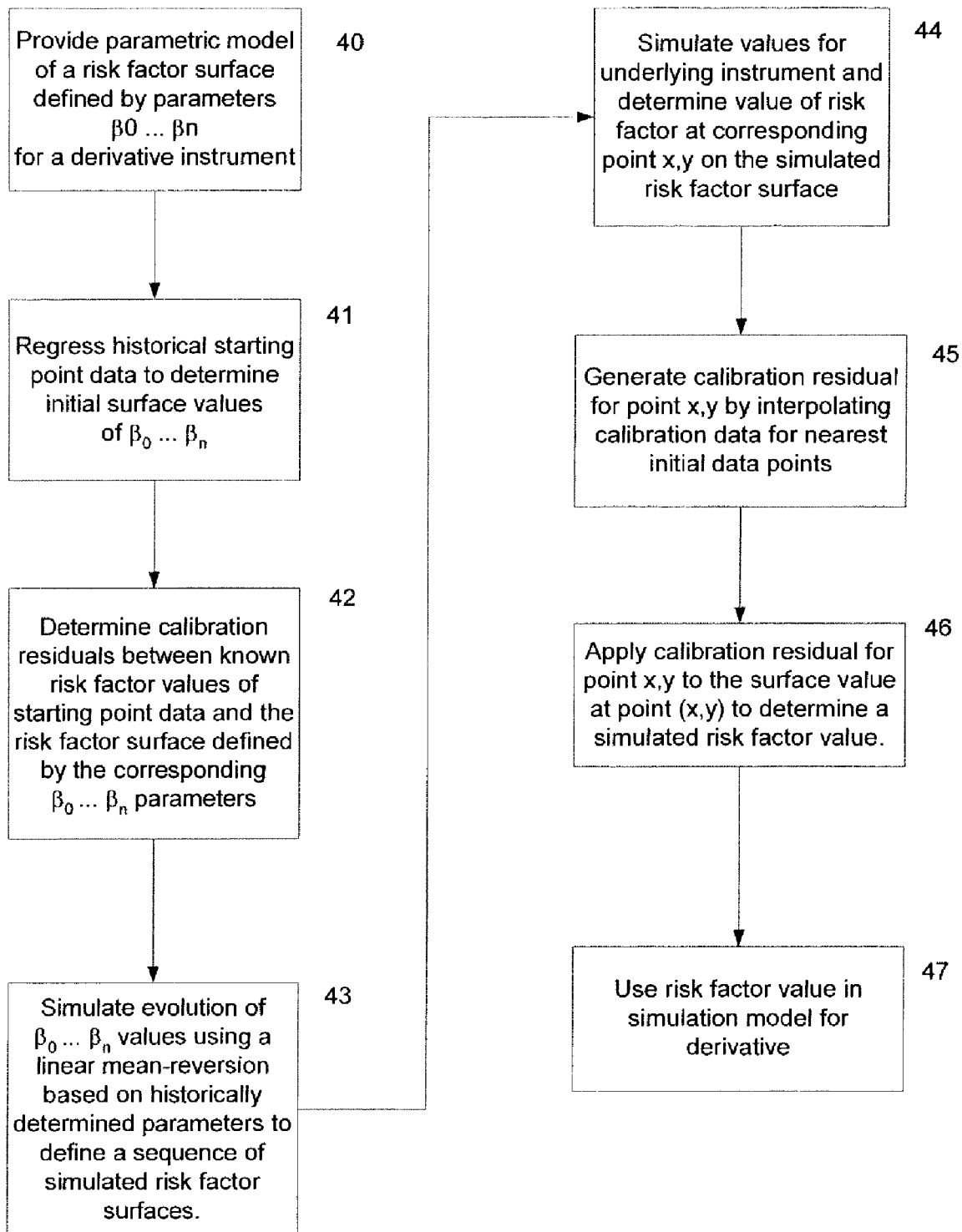
FIG. 4 is a flowchart of a method for simulating a volatility surface in accordance with the present invention.

The method for simulating a risk factor surface according to the invention is summarized in the flowchart of FIG. 4. Initially a parametric model is selected which defines a risk factor surface according to a plurality of parameters $\beta_0 \ldots \beta_n$ (step 40). The values of the risk factor on a given day for a set of instruments derivative from a given security are regressed against the risk factor surface model to determine the starting values of the surface parameters $\beta_0 \ldots \beta_n$. (Step 41) A calibration residual is determined for at least some of the points used to define the starting surface parameters which represents the difference between the source point value and the value indicated by the modeled surface. (Step 42).

Next the evolution of each of the parameters $\beta_0 \ldots \beta_n$ is simulated using a beta-evolution function. The function is preferably a linear mean-reversion process based upon historically determined values, such as a historical average for beta, beta volatility, and mean reversion speed. (Step 43). The sequences of simulated $\beta_0 \ldots \beta_n$ values define a simulated risk factor surface for each time index of each simulation run. The appropriate reference points from the simulation, such as the value of an underlying security and the delta for an option and the beta values are applied to the surface parameterization model to determine a corresponding risk factor value. (Step 44). A residual offset is determined for that point by applying the calibration data, for example via extrapolating from the calibration residual values of the nearest "real" points used during the calibration process (step 45) and this offset is applied to the risk factor value to calibrate it. (Step 46). The calibrated risk factor value is then used in the derivative pricing model, along with other data, to determine a simulated value of the derivative instrument. (Step 47).

Figure 5:
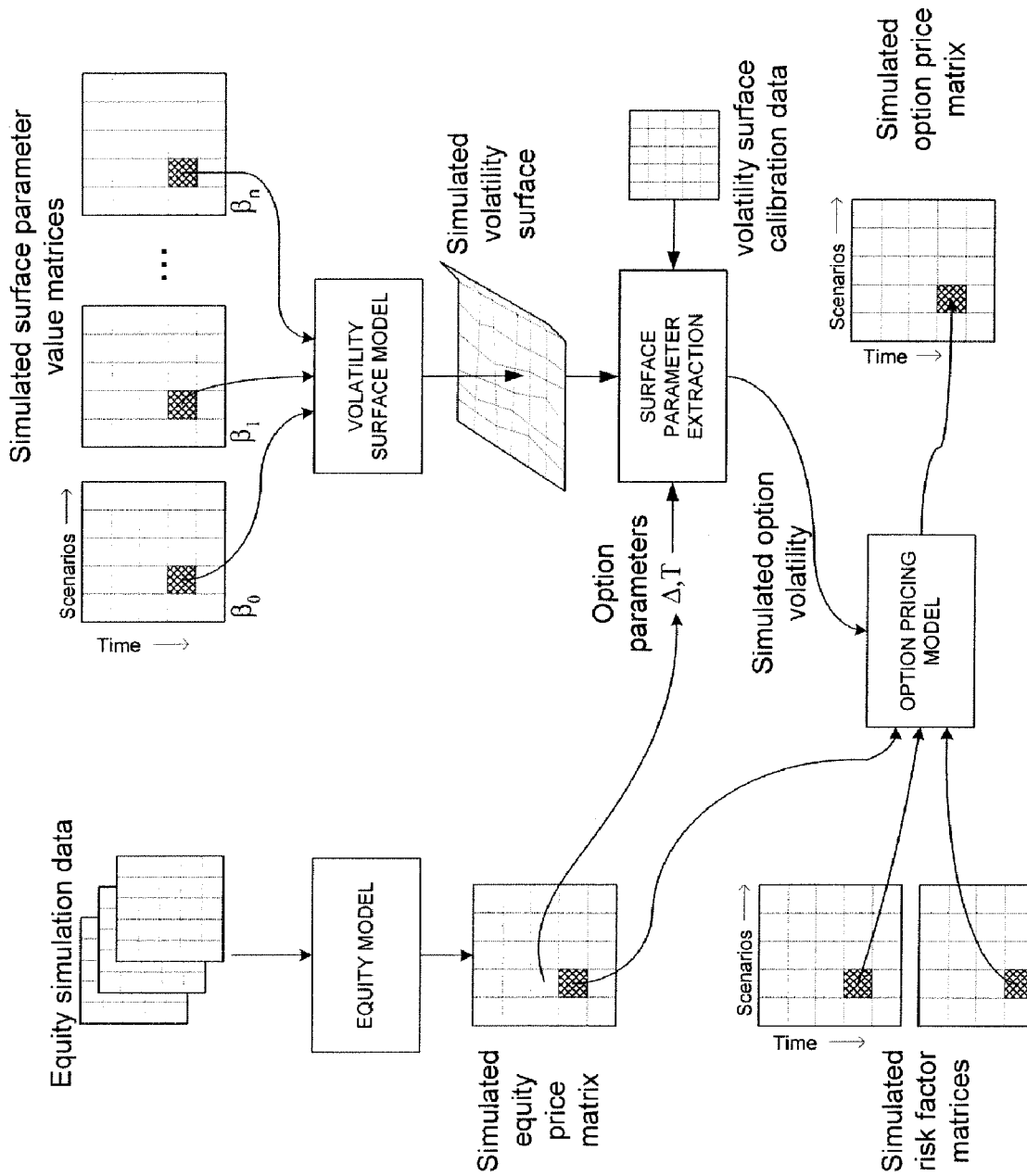
FIG. 5 is a flow diagram of a process for simulating option prices system in accordance with the present invention.

Simulation of the surface parameter values and various risk factors can be done on-the-fly during simulation. Preferably, however, the simulation is performed in two primary steps— risk-factor pre-simulation and model application. This embodiment is illustrated in FIG. 5.

Initially, all of the simulated beta factor values for each simulation "tick" of each simulation scenario are generated and stored in respective parameter value matrices. The simulated evolving values of other risk factors used in the option pricing model are also "pre-simulated" and stored in a corresponding risk-factor matrices. Such risk factors can include, for example, simulated interest and loan rate values. In addition, because the option price is dependent upon the price of an underlying equity, the price of the underlying equity is also simulated using an appropriate equity model to provide a simulated equity price matrix.

After the surface parameters, risk factors, and equity prices, as well as other values which may be necessary are precalculated, the precalculated values are extracted synchronously across the various matrices and used to simulate the option price. In particular, for a given time index of a specific simulation run, the corresponding beta surface parameters are obtained from the surface parameter matrices. These values, when applied to the volatility surface model, define the simulated volatility surface.

The simulated equity price and relevant option parameters such as $\Delta$ and T are determined for the option being simulated, for example, with reference to the simulated equity price, prior simulated values for the option, and possibly other data. The $\Delta$ and T values (or other suitable values depending on the manner in which the volatility surface defined) are applied to the simulated volatility surface and the volatility value is obtained. This value is then adjusted in accordance with the volatility surface calibration data to provide a value for the simulated option volatility at that particular point of the simulation.

Finally, the simulated option volatility along with the appropriate risk factor values (extracted from the corresponding simulated risk factor matrices) are applied to the option pricing model to produce a simulated option price for the particular option at issue. This process is repeated for each step of each simulation run and the results are stored in a simulated option price matrix. When multiple options are to be simulated, the process is repeated for each option to generate corresponding simulated option pricing matrices.

A further aspect of the invention is directed to the manner in which the evolving beta values are determined. When a parametric mean-reversion or other beta-evolution function is used to simulate changes in the surface parameter values over time, appropriate values of the corresponding noise term $\epsilon_m$ must be selected. Preferably, the values of $\epsilon_m$ are selected from a predefined set of "historical" residual values. This set can be derived by solving the beta evolution function for a sequence of beta values generated from historic volatility data to determine the sequence of noise values which recreates the "historical" beta sequence. This historical bootstrapping technique is addressed in detail in U.S. patent application Ser. No. 11/740,189, entitled "Method And System For Simulating Risk Factors In Parametric Models Using Risk Neutral Historical Bootstrapping," filed concurrently with the present application. The historical bootstrapping technique disclosed in this application can be applied to volatility surface modeling by treating the beta values as risk factors and the beta evolution equation as the corresponding parametric simulation model. The entire contents of this application is hereby expressly incorporated by reference.

For the beta evolution function of Equ. 6, the historical sequences of $\beta_{m,i}$ as well as the derived values of the mean, mean reversion speed, and beta volatility are applied to the mean-reversion beta evolution function to produce a sequence of historical residual values according to:

$$\varepsilon_{m,i} = \frac{1}{\upsilon}(\beta_{m,i} - \alpha(\theta - \beta_{m,i-1})) \quad \text{(Equ. 7)}$$

The values of the determined historical residuals $\epsilon_{m,i}$ can then used in the parametric beta evolution model during simulation in place of random noise component. Prior to simulation, the range of values of the historical residuals should be standardized to the range suitable for the corresponding random component in the model, typically such that the empirical average $E[\epsilon]=0$ and the variance $var[\epsilon]=1$. To preserve correlations which may exist between different sets of residuals from the historical sample, a linear standardization process can be applied to each residual value series to provide a corresponding standardized series:

$$\epsilon_{m,i}' = k_1 \epsilon_{m,i} + k_2 \quad \text{(Equ. 8)}$$

where the values of $k_1$ and $k_2$ are selected to provide $E[\epsilon_i'] = 0$ and $\text{var}[\epsilon_i'] = 1$ for the given series of $\epsilon_{m,i}$ at issue (and may be different for different series). During simulation of the evolving values of beta, values of $\epsilon_{m,i}$ are selected, preferably at random, to be used in the beta-evolution function. To preserve cross-correlations between the beta values, a single random index value is generated and used to select the historical residual value from the set of residuals corresponding to each beta parameter.

After the sets of historical residuals for the beta values are generated, the sets can be further processed by applying one or more bootstrapping techniques to account for certain deficiencies in the source data, adjust the statistical distribution, increase the number of available samples, or a combination of these or other factors prior to simulation. To preserve correlations that may exist between the sequences of (standardized) historical residuals for each of the beta parameters, the same bootstrapping process should be applied to each historical residual sequence.

For example, during a simulation of a large number of scenarios, the number of historical residuals used will typically greatly exceed the actual number of samples calculated from the historically derived beta values. To increase the total number of historical residuals which are available, a multi-day bootstrap procedure can be used. A preferred bootstrapping technique is to sum a set of d randomly selected samples and divide by the square-root of d to produce a new residual value:

$$\varepsilon'' = \frac{\sum_{j=1}^{d} \varepsilon_j'}{\sqrt{d}} \quad \text{(Equ. 9)}$$

This increases the total number of samples by a power of d (at the cost of reducing kurtosis, the fourth moment of the statistical distribution, for higher values of d). Preferably, a two-day bootstrapping is used. For a 250 day history, this process produces a sequence of up to 250*250=62,500 samples to draw on. Moreover, the low value of n=2 does not significantly reduce any fat-tail which may be present in the distribution.

Other pre-simulation bootstrapping procedures can be performed, such as symmetrizing the distribution of residuals to permit both increasing and decreasing beta value evolution if the source data provides betas which shift primarily in only one direction. A symmetrized set can be generated by randomly selecting two residual values i and j and combining them as:

$$\varepsilon'' = \frac{\varepsilon_i' - \varepsilon_j'}{\sqrt{2}} \quad \text{(Equ. 10)}$$

Various other bootstrapping techniques known to those of skill in the art can also be used and more than one modification to the originally derived set of historical residuals can be performed prior to the simulation.

The present invention can be implemented using various techniques. A preferred method of implementation uses a set of appropriate software routines which are configured to perform the various method steps on a high-power computing platform. The input data, and the generated intermediate values, simulated risk factors, priced instruments, and portfolio matrices can be stored in an appropriate data storage area, which can include both short-term memory and long-term storage, for subsequent use. Appropriate programming techniques will be known to those of skill in the art and the particular techniques used depend upon implementation details, such as the specific computing and operating system at issue and the anticipated volume of processing. In a particular implementation, a Sun OS computing system is used. The various steps of the simulation method are implemented as C++ classes and the intermediate data and various matrices are stored using conventional file and database storage techniques.

While the invention has been particularly shown and described with reference to preferred embodiments thereof, it will be understood by those skilled in the art that various changes in form and details can be made without departing from the spirit and scope of the invention.

The invention claimed is:

1. A processor-enabled method for simulating changes in volatility for a price of a particular option on an underlying financial instrument comprising:

providing by a processor a surface model having at least one surface parameter;

providing by the processor a set of historical volatilities for a plurality of options on the underlying financial instrument;

analyzing by the processor the set of historical volatilities to determine an initial surface parameter value for each surface parameter which, when used in the surface model, defines a surface approximating the set of historical volatilities;

generating by the processor an initial volatility surface based on the provided surface model and the determined initial surface parameter value;

determining by the processor a beta evolution function;

determining by the processor at least one evolved surface parameter value on the processor in accordance with the beta evolution function;

wherein the beta evolution function is a function of at least one beta evolution parameter, a surface parameter, and a noise component $\epsilon$;

wherein determining the at least one evolved surface parameter value by the processor comprises:

determining by the processor at least one beta evolution parameter value based at least in part on historical analysis, selecting by the processor a value of $\epsilon$ from a set of predetermined noise values associated with each surface parameter, and calculating by the processor the at least one evolved surface parameter value using the beta evolution function with the selected value of $\epsilon$;

generating by the processor at least one volatility surface based on the provided surface model and the determined at least one evolved surface parameter value;

extracting by the processor a volatility for the particular option from the generated at least one volatility surface;

generating by the processor calibration data representing offsets between at least some of the volatilities in the provided set of historical volatilities and at least some of the volatilities on the generated initial volatility surface;

adjusting by the processor the extracted volatility in accordance with the calibration data; and applying by the processor the adjusted extracted volatility to an option pricing model to provide a price for the particular option.

2. A processor-implemented method for price volatility simulation option pricing for a particular option on an underlying financial instrument comprising:
retrieving by the processor a surface model from at least one data store, the surface model having at least one surface parameter;
retrieving by the processor a set of historical volatilities from the at least one data store,
wherein the retrieved set of historical volatilities is a set of historical volatilities for a plurality of options on the underlying financial instrument;
analyzing by the processor on at least one processor the set of historical volatilities to identify at least one initial surface parameter value for each surface parameter which, when used in the surface model, defines a surface approximating the set of historical volatilities;
determining by the processor a beta evolution function;
determining by the processor on the at least one processor at least one evolved surface parameter value in accordance with the beta evolution function;
generating by the processor at least one volatility surface based on the retrieved surface model and the determined at least one evolved surface parameter value;
extracting by the processor a volatility for the particular option from the generated at least one volatility surface; and
applying by the processor the extracted volatility in a processor-enabled option pricing model to provide a price for the particular option.

3. The processor-implemented method of claim 2, further comprising:
generating by the processor an initial volatility surface based on the retrieved surface model and the at least one identified initial surface parameter value;
generating calibration data on the at least one processor, the generated calibration data representing offsets between at least some of the volatilities in the retrieved set of historical volatilities and at least some of the volatilities on the generated initial volatility surface; and
adjusting the extracted volatility in accordance with the calibration data.

4. The processor-implemented method of claim 3, further comprising:
iteratively determining surface parameter values on the at least one processor in accordance with beta evolution function to produce a sequence of values for the at least one surface parameter.

5. The processor-implemented method of claim 3, wherein a volatility is specified relative to parameters $\Delta$ and T for an associated option, the surface model has surface parameters $\beta_{0,i} \ldots \beta_{n,i}$ and the surface model is of the form:

$$\sigma_i(\Delta,T) = F(\beta_{0,i} \ldots \beta_{n,i}, \Delta, T)$$

where $\sigma_i$ is a measure of the volatility for an option at time index i with a given $\Delta$, which is a ratio of a change in option price to a change in security price, and T, which is a term remaining for the option, and F is a function of $\Delta$, T and the surface parameters $\beta_{0,i} \ldots \beta_{n,i}$.

6. The processor-implemented method of claim 3, wherein a volatility is specified relative to parameters $\Delta$ and T for an associated option, the surface model has surface parameters $\beta_{0,i} \ldots \beta_{n,i}$ and the surface model is of the form:

$$\ln \sigma_i(\Delta,T) = \beta_{0,i} + \beta_{1,i}(\Delta - x_1) + \beta_{2,i}(T - x_2)^+ + \beta_{3,i}(T - x_3)^+$$

where $\sigma_i$ is a measure of the volatility for an option at time index i with a given $\Delta$, which is a ratio of a change in option price to a change in security price, and
T, which is a term remaining for the option; where $(x)^+$ is a piecewise linear function having a value equal to x when x>0 and is otherwise equal to zero; and
$x_1$, $x_2$ and $x_3$ are constant terms determined by simulations at least in part based on historical data.

7. The processor-implemented method of claim 6, wherein $x_1$ is substantially equal to 0.5, $x_2$ is substantially equal to 4.0, and $X_3$ is substantially equal to 24.

8. The processor-implemented method of claim 2, wherein the beta evolution function is a function of at least one beta evolution parameter, a surface parameter, and a noise component $\epsilon$.

9. The processor-implemented method of claim 8, wherein the beta evolution function is a linear mean-reversion process.

10. The processor-implemented method of claim 9, wherein the surface model has surface parameters $\beta_{0,i} \ldots \beta_{n,i}$ and the beta evolution function for the surface parameter $\beta_{m,i}(0 \leq m \leq n)$ is of the form:

$$\Delta\beta_{m,i} = \alpha_m(\theta_m - \beta_{m,i-1}) + v_m \epsilon_{m,i}$$

where $\Delta\beta_{m,i}$ is a change in beta value at time index i, $\alpha_m$ is a mean-reversion speed, $\theta_m$ is a mean value for $\beta_m$, and $v_m$ is volatility of $\beta_m$, and $\epsilon_{m,i}$ is a noise term.

11. A system for option price volatility simulation option pricing for a price of a particular option on an underlying financial instrument comprising:
a computer having a processor and at least one data store, the at least one data store containing therein at least:
at least one surface model having at least one surface parameter; and
at least one set of historical volatilities for a plurality of options on the underlying financial instrument;
the processor being configured via computer software to:
retrieve the at least one surface model from the at least one data store;
retrieve the at least one set of historical volatilities from the at least one data store;
analyze the at least one set of historical volatilities to identify at least one initial surface parameter value;
determining a beta evolution function;
determine an evolved surface parameter value in accordance with a beta evolution function;
define a volatility surface approximating the at least one set of historical volatilities using the surface model and the determined evolved surface parameter value;
extract a volatility for the particular option from the defined volatility surface; and
apply the extracted volatility to a pricing model to determine a price for the particular option.

12. The system of claim 11, wherein the processor is further configured to:
generating an initial volatility surface based on the at least one surface model and the at least one identified initial surface parameter value;
generating calibration data representing offsets between at least some of the volatilities in the at least one set of historical volatilities and at least some of the volatilities on the generated initial volatility surface; and
adjust the extracted volatility in accordance with the calibration data.

13. The system of claim 12, wherein the processor is further configured to repeatedly determine each surface parameter value to produce a sequence of values for the at least one surface parameter.

14. The system of claim 12, wherein a volatility is specified relative to parameters $\Delta$ and T for an associated option, the surface model has parameters $\beta_{0,i} \ldots \beta_{n,i}$, and the surface model is of the form:

$$\sigma_i(\Delta,T)=F(\beta_{0,i} \ldots \beta_{n,i},\Delta,T)$$

where $\sigma_i$ is a measure of the volatility for an option at time index i with a given $\Delta$, which is a ratio of a change in option price to a change in security price, and T, which is a term remaining for the option, and F is a function of $\Delta$, T, and the surface parameters $\beta_{0,i} \ldots \beta_{n,i}$.

15. The system of claim 12, wherein volatility is specified relative to $\Delta$ and T values for an associated option, the surface model has surface parameters $\beta_{0,i} \ldots \beta_{n,i}$, and the surface model is of the form:

$$\ln \sigma_i(\Delta,T)=\beta_{0,i}+\beta_{1,i}(\Delta-x_1)+\beta_{2,i}(T-x_2)^++\beta_{3,i}(T-x_3)^+$$

where $\sigma_i$ is a measure of the volatility for an option at time index i with a given $\Delta$, which is a ratio of a change in option price to a change in security price, and T, which is a term remaining for the option; where $(x)^+$ is a piecewise linear function having a value equal to x when x>0 and is otherwise equal to zero; and $x_1$, $x_2$ and $x_3$ are constant terms determined by simulations at least in part based on historical data.

16. The system of claim 15, wherein $x_1$ is substantially equal to 0.5, $x_2$ is substantially equal to 4.0, and $X_3$ is substantially equal to 24.

17. The system of claim 11, wherein the beta evolution function is a function of:

at least one beta evolution parameter, a surface parameter, and a noise component $\epsilon$.

18. The system of claim 17, wherein the beta evolution function is linear mean-reversion process.

* * * * *